(12) United States Patent
Kurosawa (10) Patent No.: US 6,859,619 B2
(45) Date of Patent: Feb. 22, 2005

(54) AUTOFOCUS CAMERA HAVING MULTIPOINT FOCUS DETECTING SYSTEM

(75) Inventor: Yuichi Kurosawa, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/465,234

(22) Filed: Jun. 20, 2003

(65) Prior Publication Data

US 2003/0235410 A1 Dec. 25, 2003

(30) Foreign Application Priority Data

Jun. 21, 2002 (JP) .................................. 2002-181511

(51) Int. Cl.$^7$ ............................................. G03B 13/18
(52) U.S. Cl. ......................... 396/88; 396/121; 396/147
(58) Field of Search .............................. 396/79–83, 88, 396/121–123, 147

(56) References Cited

U.S. PATENT DOCUMENTS 5,473,403 A * 12/1995 Suda et al. .................. 396/121
6,240,253 B1 * 5/2001 Yamaguchi et al. .......... 396/61
6,584,284 B1 * 6/2003 Odaka ........................ 396/121

FOREIGN PATENT DOCUMENTS

JP          6313837          11/1994      ............ G02B/7/11

* cited by examiner

Primary Examiner—W. B. Perkey
(74) Attorney, Agent, or Firm—Greenblum & Bernstein, P.L.C.

(57) ABSTRACT

A multipoint autofocus camera, providing a plurality of focus-measuring points from which a focus-measuring point is selectable, includes a viewfinder which can visually indicate each of the plurality of focus-measuring points on a picture plane by illumination light emitted from a light source, a focal length detector for detecting a focal length of a photographing lens, a light source driver for selectively driving the light source corresponding to the plurality of focus-measuring points, and a focus-measuring-point controller for controlling an operation of the light source driver to change at least one of the number and an indication pattern of the plurality of focus-measuring points which are to be indicated on the finder view in accordance with the focal length detected by the focal length detector.

16 Claims, 6 Drawing Sheets

AUTOFOCUS CAMERA HAVING MULTIPOINT FOCUS DETECTING SYSTEM

BACKGROUND OF THE INVENTION

1. Field of the Invention

The present invention relates to an autofocus camera having a multipoint focus detecting system which can detect a focus state (an amount of defocus) at each of a plurality of focus-measuring points.

2. Description of the Prior Art

In conventional AF (autofocus) cameras, a phenomenon known in the art as "cosine error" tends to occur because the focus detecting system has, at most, one to three focus-measuring points. If the lens is swung by an angle θ to recompose after an in-focus state is achieved on the central focus-measuring point positioned substantially at the center of the picture plane seen in the viewing area of the viewfinder, a focal point deviates rearwards from the previous in-focus point by cos θ of the swung angle θ or (1-cos θ) times the object distance. This phenomenon is known as cosine error. Cosine error becomes noticeable especially in a wide-angle lens, i.e., a lens of short focal length. This is because the wide-angle lens tends to be swung by a large angle because of a wide field of view of the lens. Namely, cosine error seldom becomes a substantial problem in a telephoto lens, i.e., a lens of long focal length. In addition, cosine error tends to occur when the depth of field is small, e.g., when an iris diaphragm of the lens is widely open. Namely, cosine error seldom becomes a substantial problem when the depth of field is great.

Many AF cameras developed in recent years are equipped with a multipoint focus detecting system so that focusing is automatically achieved with a high degree of precision to satisfy photographers' demand. In such multipoint AF cameras, there is little possibility of cosine error becoming a problem because the lens seldom needs to be swung after focus is achieved.

In a multipoint AF camera, when the user selects a focus-measuring point from a plurality of focus-measuring points that are generally represented by a plurality of small frames (focusing sections) superimposed on the object image seen through the viewfinder. When the user selects a focus-measuring point of interest from the plurality of focus-measuring points, he or she operates a select button or knob to select the corresponding focusing section while viewing the same.

However, specifically when the number of focus-measuring points is great, it is troublesome for the user to select one focusing section from a great number of focusing sections because they need to move the focusing section of interest step by step by operating the select button.

SUMMARY OF THE INVENTION

The present invention provides an autofocus camera having a multipoint focus detecting system, wherein the user can easily select a focus-measuring point from among a plurality of focus-measuring points.

Other aspects, and advantages of the present invention will become apparent to one skilled in the art by reading the following disclosure and the appended claims.

According to an aspect of the present invention, a multipoint autofocus camera providing a plurality of focus-measuring points from which a focus-measuring point is selectable is provided, the multipoint autofocus camera including a viewfinder which can visually indicate each of the plurality of focus-measuring points on a picture plane by illumination light emitted from a light source, a focal length detector for detecting a focal length of a photographing lens, a light source driver for selectively driving the light source corresponding to the plurality of focus-measuring points, and a focus-measuring-point controller for controlling an operation of the light source driver to change at least one of the number and an indication pattern of the plurality of focus-measuring points which are to be indicated on the finder view in accordance with the focal length detected by the focal length detector.

It is desirable for the photographic lens to detachably attached to the camera.

It is desirable for the focal length detector to detect the focal length of the photographing lens from a memory provided in the photographing lens.

The multipoint autofocus camera can include a focus-measuring point selector for selecting one focus-measuring point from the plurality of focus-measuring points indicated on the finder view, and a differentiating device for differentiating a manner of indication of the one focus-measuring point selected by the focus-measuring point selector from a manner of indication of remaining the plurality of focus-measuring points when the one focus-measuring point is selected by an operation of the focus-measuring point selector.

It is desirable for the plurality of focus-measuring points to be represented by a corresponding plurality of focusing sections formed on a focusing screen serving as an optical element of the viewfinder.

It is desirable for each light source to include a two-color LED.

It is desirable for the light source to include a plurality of light sources to correspond to the plurality of focus-measuring points in a one-to-one relationship.

The photographing lens can be a zoom lens, and the camera can be a digital camera.

It is desirable to the plurality of focus-measuring points to be arranged in a shape of a cross.

It is desirable to the focus-measuring points remoter from a central portion of a photographing area to be manually selectable when the focal length of the photographing lens is shorter.

It is desirable to the plurality of focus-measuring points are arranged symmetrically with respect to a central portion of a photographing area.

It is desirable to the distance between two focus-measuring points which are remotest from the central portion of a photographing area is larger when the focal length of the photographing lens is shorter.

It is desirable to the distances between adjacent two focus-measuring points are substantially the same, in the plurality of focus-measuring points.

According to another embodiment of the present invention, a multipoint autofocus camera providing a plurality of focus-measuring points from which a focus-measuring point on which a photographing lens automatically focuses is selectable is provided, the multipoint autofocus camera including an indicating device for visually and selectively indicating the plurality of focus-measuring points on a picture plane viewed through a viewfinder, a focal length detector for detecting a focal length of the photographing lens, and a controller for controlling an operation of the indicating device to change at least one of the number and an indication pattern of the plurality of focus-measuring points which are to be visually and selectively indicated by the indicating device in accordance with the focal length detected by the focal length detector.

The present disclosure relates to subject matter contained in Japanese Patent Application No. 2002-181511 (filed on Jun. 21, 2002) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
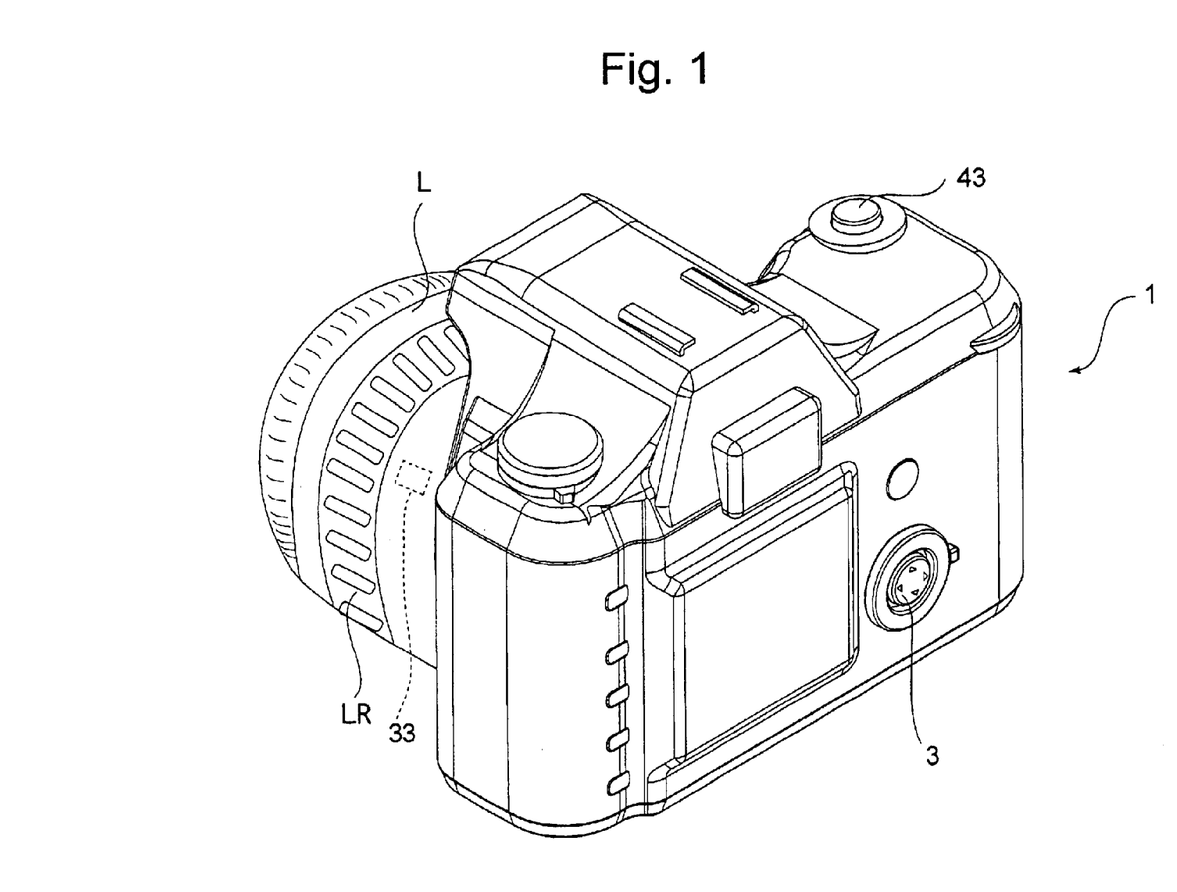
FIG. 1 is a perspective view of a camera body of a multipoint AF zoom digital camera system according to the present invention, viewed from a left rear side of the camera body.

The camera body 1 shown in FIG. 1 is a multipoint AF zoom digital camera system. An interchangeable zoom lens barrel L incorporating a photographing lens 6 (see FIG. 6) serving as a zoom lens system is detachably attached to a body mount 5 (see FIG. 2) of the camera body 1.

Figure 2:
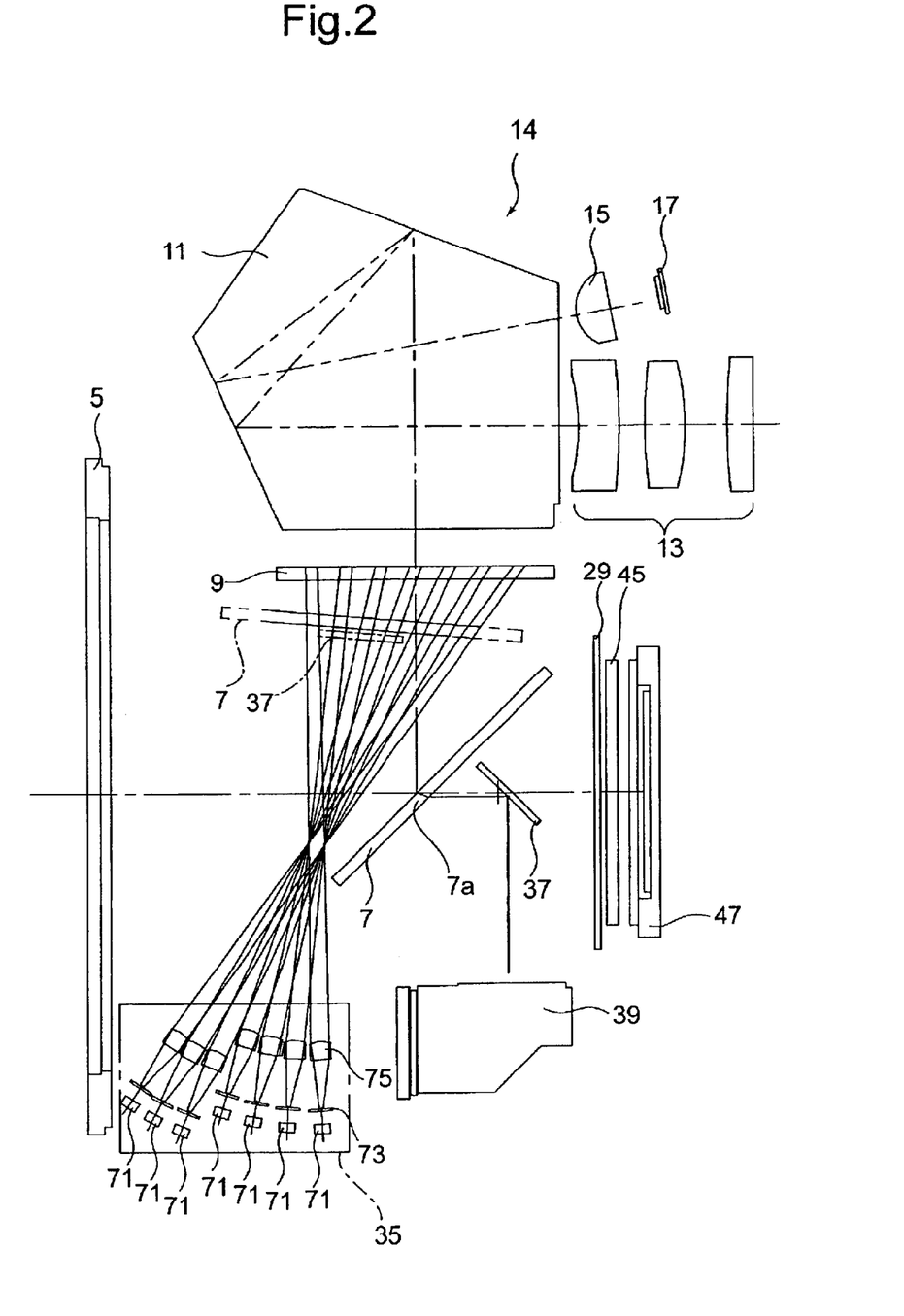
FIG. 2 is a side elevational view of fundamental optical components provided in the camera body shown in FIG. 1.

A major portion of object light (light which is to form an object image to be photographed) entering the camera body 1 through the photographing lens 6 is reflected by a main mirror (quick-return mirror) 7 toward a pentagonal prism 11 positioned above the main mirror 7, as shown in FIG. 2. Subsequently, the object light passes through a focusing screen 9 to enter the pentagonal prism 11, and is reflected more than once by the pentagonal prism 11 therein and exits out of an eyepiece 13. The focusing screen 9, the pentagonal prism 11 and the eyepiece 13 are fundamental elements of a finder optical system 14 in the camera body 1. Part of the light reflected by the pentagonal prism 11 enters a photometering device (e.g., photodiodes and photometering IC) 17 via a photometering lens 15. Note that optical paths are indicated by one-dot chain lines in FIG. 2.

Figure 3:
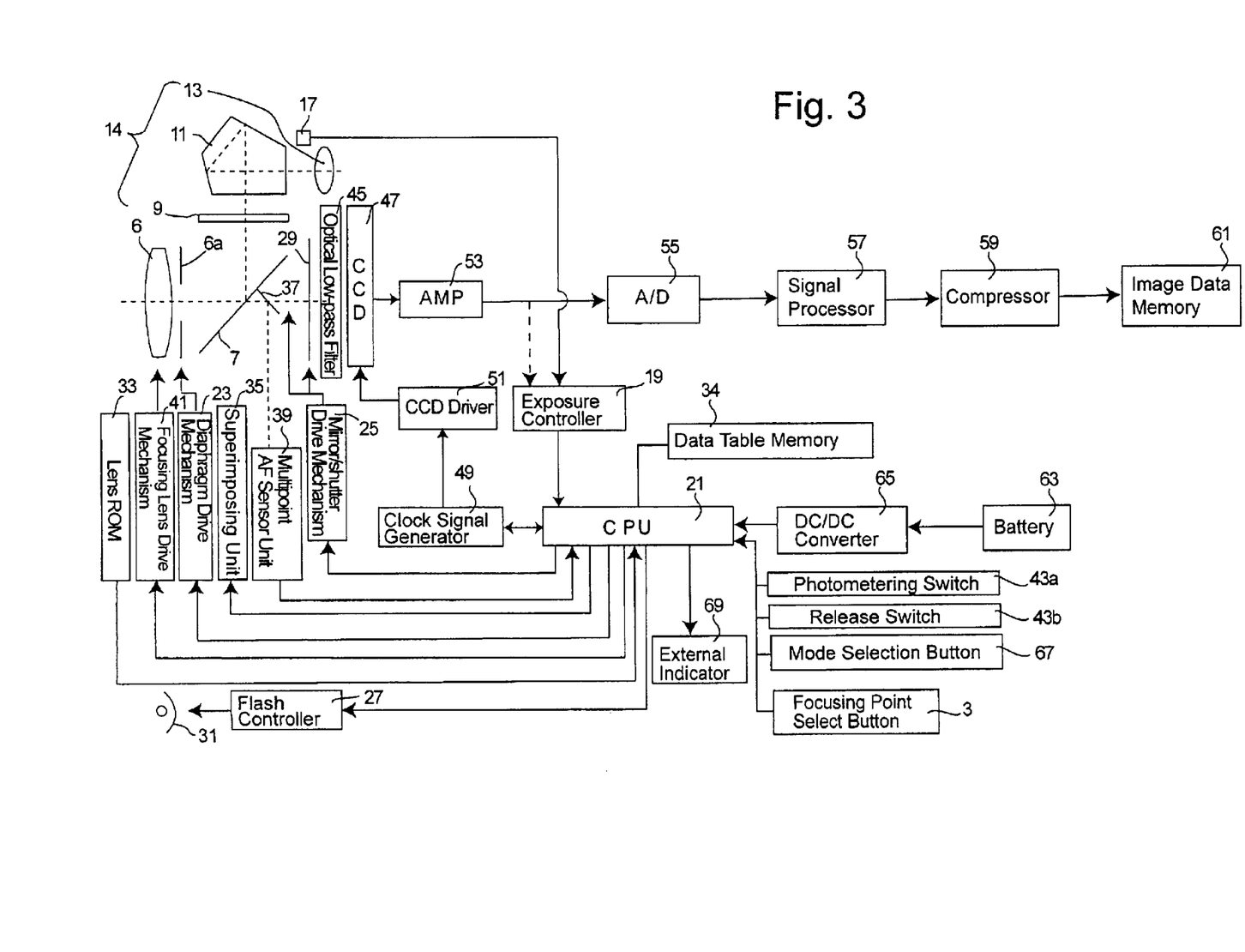
FIG. 3 is a block diagram showing fundamental components of the camera body shown in FIG. 1.

Immediately after a release button 43 is depressed by a half step to thereby turn ON a photometering switch 43a, a signal corresponding to the amount of light received by the photometering device 17 is output therefrom to an exposure controller 19, as shown in FIG. 3. The exposure controller 19 determines an exposure condition and sends the exposure condition to a CPU (focal length detector/focus-measuring-point controller/differentiating device) 21 which comprehensively controls the overall operations of the camera system. The CPU 21 outputs control signals to a diaphragm drive mechanism 23, a mirror/shutter drive mechanism 25 and a flash controller 27 in accordance with the determined exposure condition. Upon receiving a control signal from the CPU 21, the diaphragm drive mechanism 23 drives an iris diaphragm 6a provided in the zoom lens barrel in accordance with the determined exposure condition. At the same time, upon receiving a control signal from the CPU 21, the mirror/shutter drive mechanism 25 moves the main mirror 7 up and down, and drives a shutter 29 at a shutter speed determined in accordance with the determined exposure condition. The flash controller 27 outputs a drive signal to a flash (strobe) 31 to activate the flash 31 upon inputting a control signal from the CPU 21.

The user can change the focal length of the photographing lens 6 by manually turning a zoom ring LR provided on the zoom lens barrel L. The user visually checks the area of the view of the object that is focused by the photographing lens 6 by viewing the object through the viewfinder, and changes the focal length by manually turning the zoom ring LR if necessary to recompose the picture before a shutter release operation. Information on focal length is pre-stored in a lens ROM (memory) 33 provided in the zoom lens barrel L.

In the state where the zoom lens barrel L is attached to the camera body 1, the lens ROM 33 is electrically connected with the CPU 21 provided in the camera body 1 via a signal line (not shown) and a group of contact (not shown) provided on the mount 5 so that the lens ROM 33 and the CPU 21 can be communicated with each other.

When the user turns the zoom ring LR, the CPU 21, which serves as a focal length detector, reads out the information on the focal length from the lens ROM 33. The CPU 21 (serving as a focus-measuring-point controller) outputs an LED drive signal to a superimposing unit 35 in accordance with a table of focal length data and the number of focus-measuring points which is stored in a data table memory 34. The superimposing unit 35 and the CPU 21 are fundamental elements of a light source driver.

As shown in FIG. 2, a portion of the object light which is incident on the main mirror 7 passes through a half mirror portion 7a provided on the main mirror 7 to be reflected downwardly by an auxiliary mirror 37 provided at the rear of the main mirror 7. The light reflected downwardly by the auxiliary mirror 37 enters a multipoint AF sensor unit 39 provided as a multipoint focus detecting apparatus. The multipoint AF sensor unit 39 can be, for example, a phase-difference distance measuring sensor. The CPU 21 sends a signal for focus adjustment to a focusing lens drive mechanism 41 in accordance with the light incident on the multipoint AF sensor unit 39. The focusing lens drive mechanism 41 drives a movable focusing lens (not shown) provided in the photographing lens 6. The multipoint AF sensor unit 39 operates to focus the photographing lens 6 on a focus-measuring point represented by a focusing section selected by the user.

Immediately after the user fully depresses the release button 43 to thereby turn ON a release switch 43b, the CPU 21 sends a drive signal to the mirror/shutter drive mechanism 25 to retract the main mirror 7 together with the auxiliary mirror 37 from a photographing optical path behind the photographing lens 6 and to release the shutter 29 immediately after the main mirror 7 is fully retracted. Thereupon, the object light which is passed through the photographing lens 6 passes through an optical low-pass filter 45 to be incident on a CCD image sensor 47. The CCD 47 starts operating upon inputting a drive signal from the CCD driver 51. The CCD driver 51 outputs the drive signal to the CCD 47 in accordance with a clock pulse which is generated by a clock signal generator 49 controlled by the CPU 21. Information on the object light incident on the CCD 47, which is in the form of an analogue video signal, is amplified by an amplifier (AMP) 53 to be output to each of an A/D converter 55 and the exposure controller 19. The A/D converter 55 converts the analogue video signal received from the amplifier 53 into a digital video signal. This digital video signal output from the A/D converter 55 is processed by a signal processor 57, and is subsequently compressed as needed by a compressor 59 before being stored in an image data memory (e.g., a flash memory) 61. Immediately after a predetermined exposure time is elapsed, the CPU 21 sends a drive signal to the mirror/shutter drive mechanism 25 to close the shutter 29 and move the main mirror 7 together with the auxiliary mirror 37 down back into the photographing optical path behind the photographing lens 6. At the same time, the CCD 47 stops operating to complete an exposure.

A battery 63 accommodated in the camera body 1 supplies electrical power to the CPU 21 and other electrical components and mechanisms in the camera body 1. The user can select a photographing mode to be set from a plurality of photographing modes by operating a mode selection button 67. The set photographing mode and information such as information on determined exposure conditions are indicated on an external indicator 69 such as an LCD display provided on the camera body 1.

Figure 4:
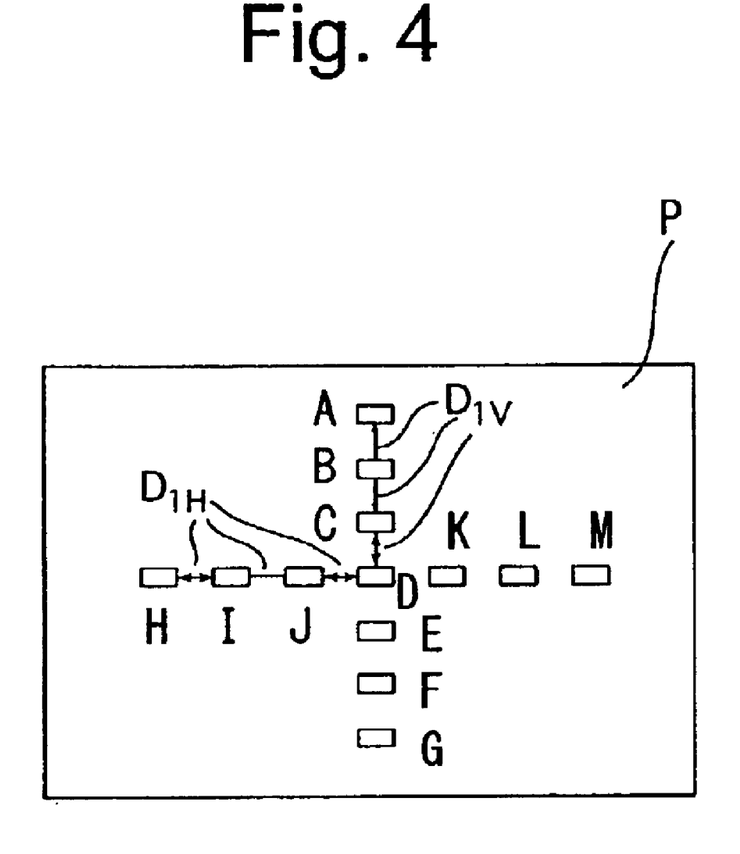
FIG. 4 is a plan view of a rectangular picture plane seen through the viewfinder of the camera body shown in FIG. 1, showing a layout of all of the focusing sections respectively representing all of the focus-measuring points on the picture plane.

In the present embodiment of the multipoint AF zoom digital camera, the user can select a focus-measuring point from a large number of focus-measuring points to automatically focus the photographing lens 6 on the selected focus-measuring point. FIG. 4 shows all the focusing sections representing all the focus-measuring points on a rectangular picture plane P in the viewing area viewed through the viewfinder of the camera body 1. Each of the thirteen focusing rectangular sections A through M is superimposed on the picture plane P when illuminated by a corresponding red-green LED (two-color LED) 71 in the superimposing unit 35, and does not appear in the picture plane P when not illuminated by the corresponding red-green LED 71. The thirteen focusing sections A through M are formed on the focusing screen 9, and are arranged in the shape of a cross. More specifically, seven focusing sections A, B, C, D, E, F and G are aligned vertically in that order from top to bottom, and are spaced along the center of the focusing screen 9, and seven focusing sections H, I, J, D, K, L and M are aligned horizontally in that order from left to right, and spaced along the center of the focusing screen 9. Accordingly, the focusing section D is positioned at the center of the focusing screen 9. Also, the focusing section D is located at a position corresponding to a central portion of a photographing area. The focusing sections E, F and G are located respectively at positions which are symmetrical to the focusing sections C, B and A with respect to the focusing section D. The focusing sections H, I and J are located respectively at positions which are symmetrical to the focusing sections M, L and K with respect to the focusing section D.

The focusing points A, B, C, D, E, F and G are arranged in the vertical direction so that the distances between adjacent focusing points are the same by $D_{1V}$. In the same manner, the focusing points H, I, J, D, K, L and M are arranged in the horizontal direction so that the distances between adjacent focusing points are the same by $D_{1H}$.

As shown in FIG. 2, the superimposing unit 35 is positioned in the camera body 1 between the body mount 5 and the multipoint AF sensor unit 39. The superimposing unit 35 is provided therein with thirteen red-green LEDs (two-color LEDs) 71 to correspond to the thirteen focusing sections A through M, respectively, and is further provided therein with thirteen pattern masks 73 and thirteen condenser lenses 75 which are positioned on the optical axes of the thirteen red-green LEDs 71, respectively. The thirteen LEDs 71 are arranged in the shape of a cross to correspond to the arrangement of the thirteen focusing sections A through M. Accordingly, the center LED 71 is used to illuminate the center focusing section D that serves as the center focusing section of the vertically arranged seven focusing sections and also the center of the horizontally arranged seven focusing sections. The light emitted from each LED 71 is shaped to correspond to the shape of the corresponding focusing section on the focusing frame 9 by the associated pattern mask 73, and is subsequently incident on the focusing screen 9 via the associated condenser lens 75. The thirteen LEDs 71 are controlled independently of one other by drive signals generated by the CPU 21.

The details of a focus-measuring point selecting operation will be discussed hereinafter. In this particular embodiment of the multipoint AF zoom digital camera system, the number of the focus-measuring points (the focusing sections on the focusing screen 9) which can be selected by the user changes in accordance with the focal length of the photographing lens 6 so that the user can select a focus-measuring point from among an adequate number of focus-measuring points. This does not require the user to perform a complicated operation for the selection of a focus-measuring point on which the user desires to focus the photographing lens 6, thereby providing a photographic condition causing no cosine error.

Figure 5A:
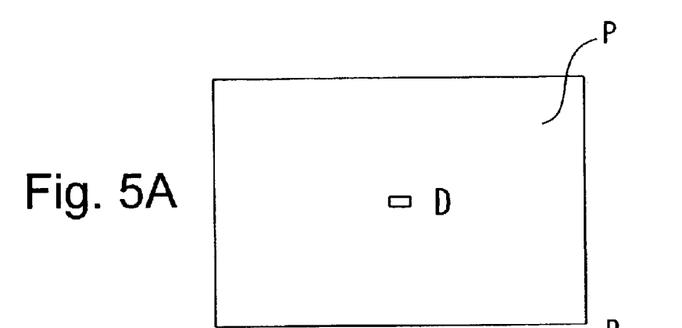
FIG. 5A is a view similar to that of FIG. 4 and illustrates the picture plane in which only a center focusing section D is illuminated to be visually indicated when the focal length is set at 85 mm or greater.
Figure 5B:
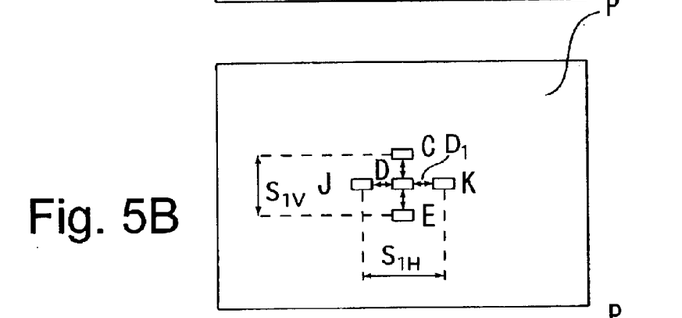
FIG. 5B is a view similar to that of FIG. 4 and illustrates the picture plane in which only five specific focusing sections (C, D, E, J and K) are illuminated to be visually indicated when the focal length is set at 50 mm or greater, and smaller than 85 mm.
Figure 5C:
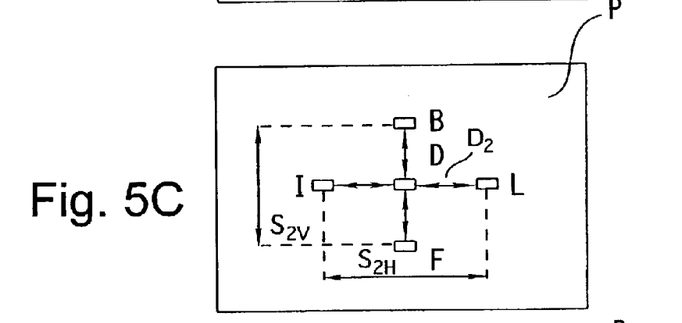
FIG. 5C is a view similar to that of FIG. 4 and illustrates the picture plane in which only five specific focusing sections (B, D, F, I and L) are illuminated to be visually indicated when the focal length is set at 30 mm or greater, and smaller than 50 mm.
Figure 5D:
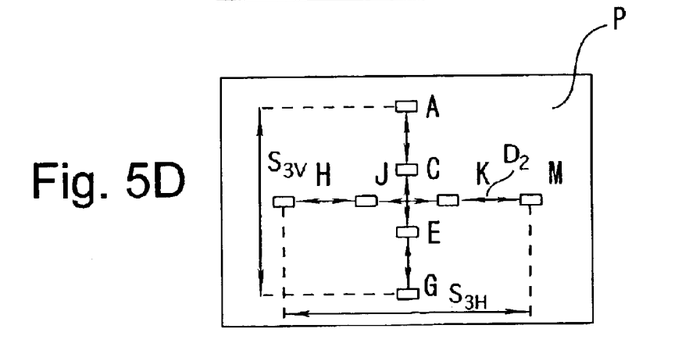
FIG. 5D is a view similar to that of FIG. 4 and illustrates the picture plane in which only eight specific focusing sections (A, C, E, G, H, J, K and M) are illuminated to be visually indicated when the focal length is set under 30 mm.

Each of FIGS. 5A through 5D shows the picture plane P in which one or more focusing sections respectively representing one or more focus-measuring points are illuminated to be visually indicated when the focal length is set at a predetermined focal length. FIG. 5A shows the picture plane P in which only the center focusing section D are illuminated to be visually indicated when the focal length is set at 85 mm or greater. FIG. 5B shows the picture plane P in which the five focusing sections C, D, E, J and K are illuminated to be visually indicated when the focal length is set at 50 mm or greater, and smaller than 85 mm. FIG. 5C shows the picture plane P in which the five focusing sections B, D, F, I and L are illuminated to be visually indicated when the focal length is set at 30 mm or greater, and smaller than 50 mm. FIG. 5D shows the picture plane P in which the eight focusing sections A, C, E, G, H, J, K and M are illuminated to be visually indicated when the focal length is set under 30 mm.

Accordingly, the number of focus-measuring points from which the user can select a focus-measuring point increases as the focal length becomes shorter. This control has been devised from the tendency of the user desiring to choose a focus-measuring point from a larger number of focus-measuring points on the picture plane P as the focal length becomes shorter because the angle of view becomes greater as the focal length becomes shorter, and further from the tendency of a smaller number of focus-measuring points being sufficient as the focal length becomes greater because the angle of view becomes smaller as the focal length become greater. In addition, since cosine error is more liable to occur as the focal length becomes shorter, if a large number of focus-measuring points are arranged on the picture plane P, the user does not need to swing the camera body 1 (the zoom lens barrel) after focus is achieved so that occurrence of cosine error is very little. When the focal length is long, the user is not required to perform a complicated operation for the selection of a focus-measuring point since cosine error does not easily occur. Although the number of focus-measuring points on the picture plane P shown in FIG. 5B is the same as that shown in FIG. 5C, the spacing between adjacent focus-measuring points (focusing sections) on the picture plane P shown in FIG. 5C, wherein the focal length is shorter than the focal length in the case shown in FIG. 5B, is set greater than the spacing between adjacent focus-measuring points (focusing sections) on the picture plane P shown in FIG. 5B. This prevents the user from swinging the camera body 1 largely because the user may swing the camera body 1 largely if the spacing between adjacent focus-measuring points on the picture plane P is great in the case where the focal length is short.

As shown in FIGS. 5A to 5D, the focus measuring point positioned nearer to or at the central portion of the photographing area are manually selectable when the focal length of the photographing lens 6 is longer (the photographing lens has more telescopic angle), while the focus measuring points farther or remoter from the central portion of the photographing area are manually selectable when the focal length of the photographing lens 6 is shorter. Accordingly, the distance between two focus measuring points which are farthest from the central portion of the photographing area is larger when the focal length of the photographing lens 6 is shorter.

With the constitution that the distance S between the two focus measuring points remotest from the central portion of the photographing area is set smaller (larger) when the focal length is longer (shorter), the focus measuring points can be aligned so that the focus measuring points can overlapped on the object image effectively. The distance is set as $S_{1H}$ in the horizontal direction in FIG. 5B, which is a distance between the focus measuring points J and K remotest from D corresponding to the central portion of the photographing area while $S_{1V}$ in the vertical direction in FIG. 5B, which is a distance between the focus measuring points C and E. In the same manner, the distances are set as $S_{2H}$ which is a distance between I and L, $S_{2V}$ which is a distance between B and F, $S_{3H}$ which is a distance between H and M, $S_{3V}$ which is a distance between A and G, respectively in the horizontal direction and vertical direction of FIG. 5C and the horizontal direction and vertical direction of FIG. 5D. The distance $S_{1H}$, $S_{2H}$ $S_{3H}$ in the horizontal direction, and $S_{1V}$, $S^{2V}$, $S^{3V}$ in the vertical direction satisfy following relationships: $S_{1V} < S_{2V} < S_{3V}$ and $S_{1H} < S_{2H} < S_{3H}$.

The focus measuring points are selected so that each of the adjacent focus measuring points has substantially the same distance or interval D. For example, in the state shown in FIG. 5B, each of the adjacent focus measuring points has a distance of $D_1$. In FIGS. 5C and 5D, each of the adjacent focus measuring points has a distance of $D_2$. The distances of $D_2$ and $D_1$ satisfy the relationship of "$D_2 < D_1$".

With the constitution that the distances D between each set of adjacent focus measuring points are set the same, and the distance D is set greater when the focal length is shorter, the number of the focus measuring points which can be quickly and rightly selected by the user can be suppressed or controlled to necessary and sufficient level.

Figure 6:
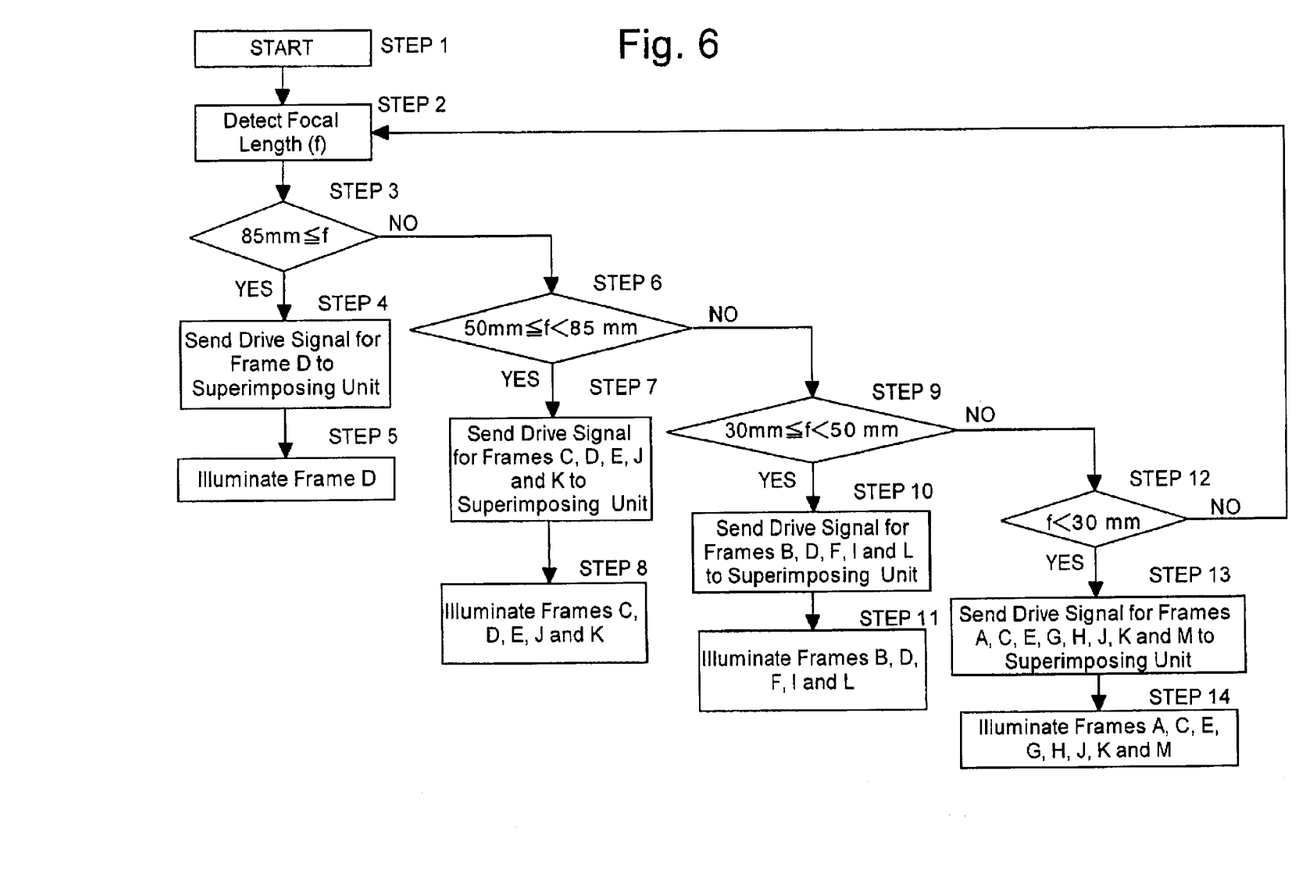
FIG. 6 is a flow chart showing a process of changing the indication pattern of the focusing sections in accordance with a detected focal length of an interchangeable photographing lens mounted on the camera body of FIG. 1.

The variations of the indication pattern of the focusing sections seen in the picture plane P will be hereinafter discussed in detail with reference to the flow chart shown in FIG. 6. The flow chart shown in FIG. 6 shows a process of changing the indication pattern of the focusing sections in accordance with a detected focal length of the photographing lens 6. Operations of this indication pattern changing process are performed by the CPU 21. Control starts performing the process shown in FIG. 6 immediately after the power of the camera is turned ON by the user, or immediately after the zoom ring is operated by the user when the power of the camera is ON (step 1). Thereupon, information on focal length of the photographing lens 6 which corresponds to the current rotational position (rotational angle) of the zoom ring is read out of the lens ROM 33 by the CPU 21 to detect a focal length f (step 2).

Subsequently, it is determined whether the focal length f detected at step 2 is equal to or greater than 85 mm (step 3). If it is determined that the focal length f is equal to or greater than 85 mm (if YES at step 3), the CPU 21 (acting as a differentiating device) sends a drive signal for turning ON a green light emitter of the red-green LED 71 for the focusing section D to the superimposing unit 35 in accordance with the information stored in the data table memory 34 (step 4). Upon receiving the drive signal, the superimposing unit 35 turns ON the green light emitter of the red-green LED 71 for the focusing section D so that the focusing section D is illuminated green (step 5).

If it is determined at step 3 that the focal length f is not equal to or greater than 85 mm (if NO at step 3), it is determined whether the focal length f detected at step 2 is equal to or greater than 50 mm and smaller than 85 mm (step 6). If it is determined that the focal length f is equal to or greater than 50 mm and smaller than 85 mm (if YES at step 6), the CPU 21 sends a drive signal for turning ON green light emitters of the red-green LEDs 71 for the focusing sections C, D, E, J and K to the superimposing unit 35 in accordance with the information stored in the data table memory 34 (step 7). Upon receiving the drive signal, the superimposing unit 35 turns ON the green light emitters of the red-green LEDs 71 for the focusing sections C, D, E, J and K so that each of the focusing sections C, D, E, J and K is illuminated green (step 8).

If it is determined at step 6 that the focal length f is not equal to or greater than 50 mm and smaller than 85 mm (if NO at step 6), it is determined whether the focal length f detected at step 2 is equal to or greater than 30 mm and smaller than 50 mm (step 9). If it is determined that the focal length f is equal to or greater than 30 mm and smaller than 50 mm (if YES at step 9), the CPU 21 sends a drive signal for turning ON green light emitters of the red-green LEDs 71 for the focusing sections B, D, F, I and L to the superimposing unit 35 in accordance with the information stored in the data table memory 34 (step 10). Upon receiving the drive signal, the superimposing unit 35 turns ON the green light emitters of the red-green LEDs 71 for the focusing sections B, D, F, I and L so that each of the focusing sections B, D, F, I and L is illuminated green (step 11).

If it is determined at step 9 that the focal length f is not equal to or greater than 30 mm and smaller than 50 mm (if NO at step 9), it is determined whether the focal length f detected at step 2 is smaller than 30 mm (step 12). If it is determined that the focal length f is smaller than 30 mm (if YES at step 12), the CPU 21 sends a drive signal for turning ON green light emitters of the red-green LEDs 71 for the focusing sections A, C, E, G, H, J, K and M to the superimposing unit 35 in accordance with the information stored in the data table memory 34 (step 13). Upon receiving the drive signal, the superimposing unit 35 turns ON the green light emitters of the red-green LEDs 71 for the focusing sections A, C, E, G, H, J, K and M so that each of the focusing sections A, C, E, G, H, J, K and M is illuminated green (step 14).

If it is determined at step 12 that the focal length f is not smaller than 30 mm (if NO at step 12), control returns to step 2.

The user can select a focusing section from one or more focusing sections illuminated in the above described manner by the corresponding red-green LEDs 71. In this selection operation, the user operates a round select button (focus-measuring point selector) 3 provided on the back wall of the camera body 1 to select a focusing section from one or more illuminated focusing sections. The select button 3 serves as a fundamental element of a focus-measuring point section device. The round select button 3 is provided thereon, at equi-angular intervals along the rim of the round select button 3, with four arrows (an up-pointing arrow, a down-pointing arrow, a left-pointing arrow and a right-pointing arrow) as shown in FIG. 1. A focusing section can be selected from among the illuminated focusing sections while the selected focusing section can be moved to another focusing section, one by one, among the illuminated focusing sections by pressing the round select button 3 at either of the four arrows thereon as appropriate. After having been selected in this manner, the selected focusing section can be determined (set) by pressing the center of the round select button 3. Thereafter, the CPU 21 sends a drive signal for turning ON a red light emitter of the red-green LED 71 for the determined focusing section to the superimposing unit 35. Upon receiving the drive signal, the superimposing unit 35 turns ON the red light emitter of the red-green LED 71 for the determined focusing section so that it illuminates red. Thereafter, if the release button 43 is fully depressed to turn ON the release switch 43b, the CPU 21 sends a drive signal to the focusing lens drive mechanism 41 to focus the photographing lens 6 on the focus-measuring point indicated by the determined red-illuminated focusing section.

Although the red-green LEDs 71 are used as the two-color LEDs provided in the multipoint AF sensor unit 39 in the above illustrated embodiment of the digital camera, any other type two-color LEDs using another combination of different colors (e.g., blue and red) can be used instead.

It is possible that only the focusing section selected by an operation of the round select button 3 is illuminated while the remaining focusing sections are not illuminated. Alternatively, the intensity of illumination light for the selected focusing section and the intensity of illumination light for each of the remaining focusing sections can be made different from each other. Each LED 71 can be replaced by any other kind of light emitter.

Although the multipoint focus detecting apparatus is provided with a plurality of light sources (LEDs) to correspond to a plurality of focusing sections (A through G) in a one-to-one relationship in the above illustrated embodiment of the digital camera, the number of the light emitters can be smaller than the number of the focusing sections. For instance, the multipoint focus detecting apparatus can be provided therein with only one light source. In this case, a plurality of shutters can be installed to correspond to the plurality of focusing sections in a one-to-one relationship.

Although the present invention is applied to a digital camera that uses a CCD image sensor as an image pick-up device in the above illustrated embodiment, the present invention can also be applied to any other type of camera such as an SLR camera using conventional sensitive film.

The interchangeable zoom lens barrel which is detachably attached to the above illustrated embodiment of the camera body can be either a manual zoom lens or a motor-driven zoom lens (a power zoom lens). The present invention can also be applied to a camera body of a non-zoom type SLR camera system to which interchangeable lenses having different fixed focal lengths can be selectively attached. In this case, immediately after the power of the camera is turned ON, information on the focal length of the attached interchangeable lens which is stored in a lens ROM provided in the interchangeable lens is read out of the lens ROM by a CPU so that one or more focusing sections which correspond to the fixed focal length of the interchangeable lens are illuminated in the picture plane viewed through the viewfinder.

The present invention can be applied to a camera in which an attached lens is undetachable from the camera body.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A multipoint autofocus camera providing a plurality of focus-measuring points from which a focus-measuring point is selectable, said multipoint autofocus camera comprising:
   a viewfinder configured to visually indicate each of said plurality of focus-measuring points on a picture plane by illumination light emitted from a light source;
   a focal length detector for detecting a focal length of a photographing lens;
   a light source driver for selectively driving said light source corresponding to said plurality of focus-measuring points; and
   a focus-measuring-point controller for controlling an operation of said light source driver to change the number of said plurality of focus-measuring points indicated in said viewfinder such that the number of said plurality of focus-measuring points indicated increases when said focal length detected by said focal length detector decreases and such that the number of said plurality of focus-measuring points indicated decreases when said focal length detected by said focal length detector increases,
   said controller further controlling said plurality of focus-measuring points indicated in said viewfinder such that a distance between adjacent focus-measuring points.

2. The multipoint autofocus camera according to claim 1, wherein said photographic lens is detachably attachable to said camera.

3. The multipoint autofocus camera according to claim 1, wherein said focal length detector detects said focal length of said photographing lens in association with a memory provided in said photographing lens.

4. The multipoint autofocus camera according to claim 1, further comprising:
   a focus-measuring point selector for selecting one focus-measuring point from said plurality of focus-measuring points indicated on said viewfinder; and
   a differentiating device for differentiating a manner of indication of said one focus-measuring point selected by said focus-measuring point selector from a manner of indication of remaining focus-measuring points of said plurality of focus-measuring points when said one focus-measuring point is selected by an operation of said focus-measuring point selector.

5. The multipoint autofocus camera according to claim 1, wherein said plurality of focus-measuring points are represented by a corresponding plurality of focusing sections provided on a focusing screen serving as an optical element of said viewfinder.

6. The multipoint autofocus camera according to claim 1, wherein each said light source comprises a two-color LED.

7. The multipoint autofocus camera according to claim 1, wherein said light source comprises a plurality of light sources that correspond to said plurality of focus-measuring points in a one-to-one relationship.

8. The multipoint autofocus camera according to claim 1, wherein said photographing lens comprises a zoom lens.

9. The multipoint autofocus camera according to claim 1, wherein said camera comprises a digital camera.

10. The multipoint autofocus camera according to claim 1, wherein said plurality of focus-measuring points are arranged in a shape of a cross.

11. The multipoint autofocus camera according to claim 1, wherein focus-measuring points spaced from a central portion of a photographing area are manually selectable when said focal length of said photographing lens is shorter.

12. The multipoint autofocus camera according to claim 1, wherein said plurality of focus-measuring points are arranged symmetrically with respect to a central portion of a photographing area.

13. The multipoint auto focus camera according to claim 1, wherein a distance between two focus-measuring points which are farthest from said central portion of a photographing area is larger when said focal length of said photographing lens is shorter.

14. The multipoint autofocus camera according to claim 1, wherein, in said plurality of focus-measuring points, distances between adjacent two focus-measuring points are substantially the same.

15. A multipoint autofocus camera providing a plurality of focus-measuring points from which a focus-measuring point on which a photographing lens automatically focuses is selectable, said multipoint autofocus camera comprising:
   an indicating device for visually and selectively indicating said plurality of focus-measuring points on a picture plane viewed through a viewfinder;
   a focal length detector for detecting a focal length of said photographing lens; and
   a controller for controlling an operation of said indicating device to change the number of said plurality of focus-measuring points which are to be visually indicated by said indicating device in accordance with said focal length detected by said focal length detector such that the number of said plurality of focus-measuring points increases when said focal length detected by said focal length detector decreases and such that the number of said plurality of focus-measuring points decreases when said focal length detected by said focal length detector increases,
   said controller further controlling said plurality of focus-measuring points indicated in said viewfinder such that a distance between adjacent focus-measuring becomes longer when said focal length becomes shorter.

16. The multipoint autofocus camera according to claim 2, wherein said focal length detector detects said focal length of said photographing lens in association with a memory provided in said photographing lens.

* * * * *